United States Patent
Parham, Jr. et al.

(10) Patent No.: US 11,691,723 B2
(45) Date of Patent: Jul. 4, 2023

(54) ROTOR ASSEMBLY WITH STATIC MAST AND PIVOTING ROTOR HUB

(71) Applicant: Bell Textron Inc., Fort Worth, TX (US)

(72) Inventors: Thomas C. Parham, Jr., Colleyville, TX (US); Frank Bradley Stamps, Colleyville, TX (US); Jouyoung Jason Choi, Southlake, TX (US); Albert Gerard Brand, North Richland Hills, TX (US); Michael Scott Seifert, Southlake, TX (US); Richard E. Rauber, Colleyville, TX (US); John E. Brunken, Jr., Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/307,845

(22) Filed: May 4, 2021

(65) Prior Publication Data

US 2022/0355924 A1    Nov. 10, 2022

(51) Int. Cl.
| | |
|---|---|
| *B64C 29/00* | (2006.01) |
| *B64C 11/32* | (2006.01) |
| *B64C 11/00* | (2006.01) |
| *B64C 11/02* | (2006.01) |

(52) U.S. Cl.
CPC ........ *B64C 29/0033* (2013.01); *B64C 11/008* (2013.01); *B64C 11/02* (2013.01); *B64C 11/32* (2013.01)

(58) Field of Classification Search
CPC ... B64C 29/0033; B64C 11/008; B64C 11/06; B64C 11/32; B64C 11/02; B64C 27/41; F16D 3/26
See application file for complete search history.

(56) References Cited

U.S. PATENT DOCUMENTS

| | | | | |
|---|---|---|---|---|
| 9,388,862 | B2 * | 7/2016 | Lidak | F16D 3/30 |
| 11,136,116 | B2 * | 10/2021 | Maresh | B64C 27/35 |
| 2014/0169963 | A1 * | 6/2014 | Carreker | B64C 27/52 |
| | | | | 416/114 |
| 2014/0274427 | A1 * | 9/2014 | Foskey | B64C 27/37 |
| | | | | 29/898.04 |
| 2019/0112041 | A1 * | 4/2019 | Haldeman | B64C 27/51 |
| 2019/0300151 | A1 * | 10/2019 | Baldwin | B29C 70/86 |

\* cited by examiner

*Primary Examiner* — Joshua J Michener
*Assistant Examiner* — Cindi M Curry
(74) *Attorney, Agent, or Firm* — Lightfoot & Alford PLLC

(57) ABSTRACT

A gimbaled rotor assembly for an aircraft. The gimbaled rotor assembly including a static mast; a spherical bearing comprising an inner component and an outer component pivotable relative to each other about a bearing focus, the inner component fixedly coupled to the static mast; a rotor hub rotatably coupled to the outer component, allowing for relative rotation of the rotor hub about a rotor axis and for pivoting together with the outer component about the bearing focus; and a primary hub spring coupling the outer component to the static mast and configured for opposing pivoting of the rotor hub about the bearing focus from a neutral position.

20 Claims, 12 Drawing Sheets

ROTOR ASSEMBLY WITH STATIC MAST AND PIVOTING ROTOR HUB

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Rotary-wing aircraft, such as tiltrotor aircraft, have at least one rotor for providing thrust. An important objective in rotorcraft design is weight savings. It is difficult to reduce the weight of the rotor mast due to the tremendous loads carried by the rotor mast. The rotor mast must transmit torque from the transmission to the hub and must transmit the thrust force created by the rotating blades to carry the full weight of the rotorcraft. Additionally, the rotor mast is subject to lateral loads created by the movement of the aircraft and wind. In some designs, a rotor mast transmits the torque and thrust forces through a single rotating shaft. Rotor masts are very strong and heavy to accommodate the large forces, as failure of the rotor mast could lead to a catastrophic disaster.

Additionally, rotor assemblies may provide for flapping of the rotor blades. To equalize lift across a rotor disc, an advancing blade flaps upward while a retreating blade flaps downward. In some designs, the components that allow for blade flapping are disposed on a part of the rotor assembly that rotates with the blades about the rotor axis and each blade may have its own set of components that allow for blade flapping. The components for blade flapping may be heavy and add a significant amount of weight that must be absorbed by the rotor mast.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The disclosure provides a static-mast rotor assembly with a pivoting rotor-hub assembly. The rotor-hub assembly comprises a spherical rotor bearing and a hub. The rotor bearing has an inner component mounted to a static mast and an outer component pivotally coupled to the inner component. The hub is rotatably coupled to the outer component so that the hub may rotate about a rotor axis relative to the outer component and also pivot together with the outer component about a rotor bearing focus. The rotor assembly includes a hub spring coupling the outer component to the static mast to oppose pivoting of the hub from a neutral position. Because the rotor-hub assembly allows for pivoting of the hub relative to the static mast, the rotor-hub assembly can be referred to as a gimbaled rotor-hub assembly.

Figure 1:
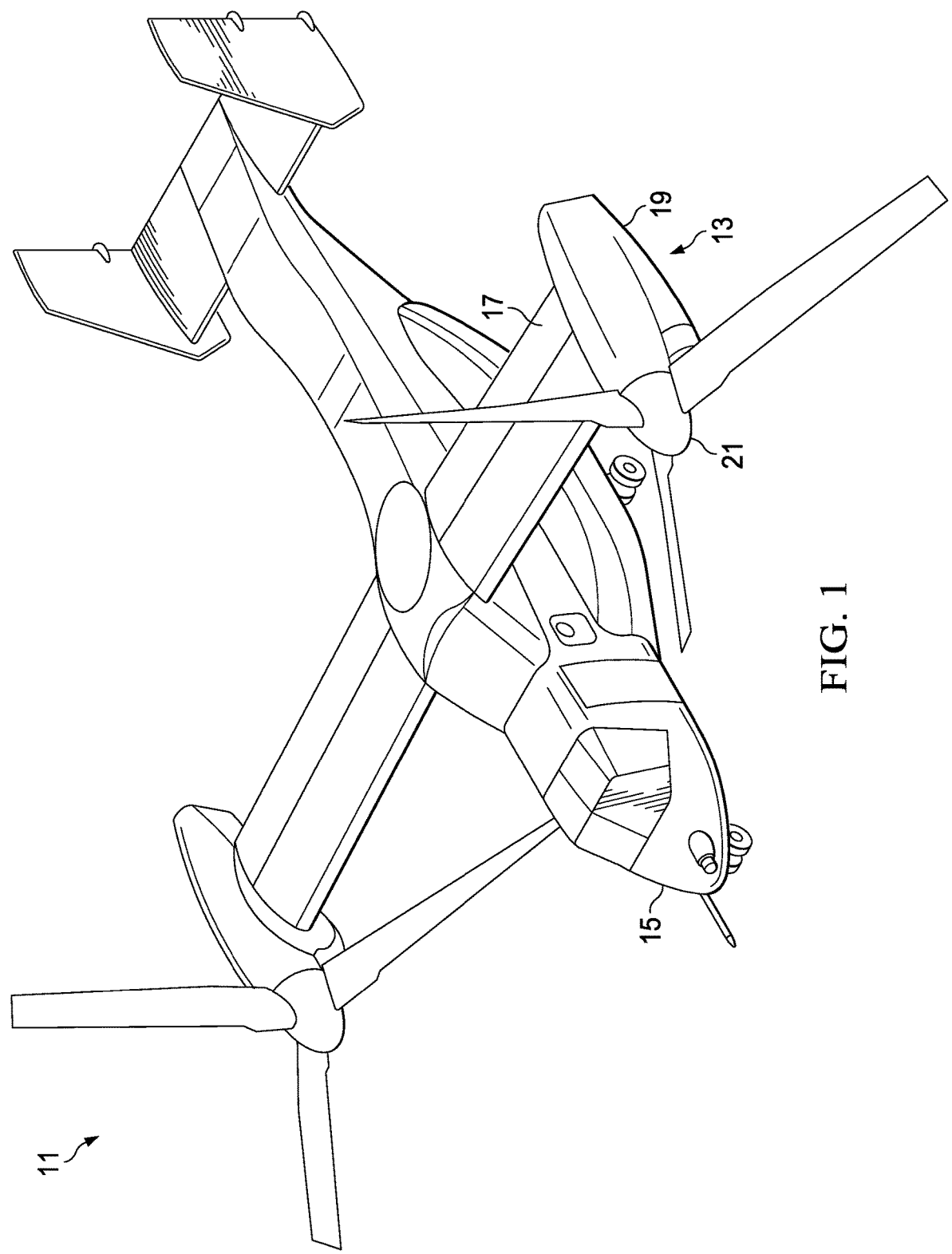
FIG. 1 is an oblique view of a tiltrotor aircraft according to this disclosure.

Referring to FIG. 1, a tiltrotor aircraft 11 is illustrated. Many of the components of aircraft 11 disposed on one side of fuselage 15 are mirrored on the other side of fuselage 15. For clarity, only one side of aircraft 11 will be described. A propulsion assembly 13 is coupled to fuselage 15 by a wing 17. Propulsion assembly 13 includes a nacelle 19, which typically carries the powerplant and transmission of tiltrotor aircraft 11. A rotor hub 21 is carried on an end of propulsion assembly 13, and propulsion assembly 13 pivots relative to wing 17 between a helicopter mode, in which propulsion assembly 13 is tilted upward, and an airplane mode, in which propulsion assembly 13 is tilted forward. FIG. 1 illustrates tiltrotor aircraft 11 in the airplane mode.

Figure 2:
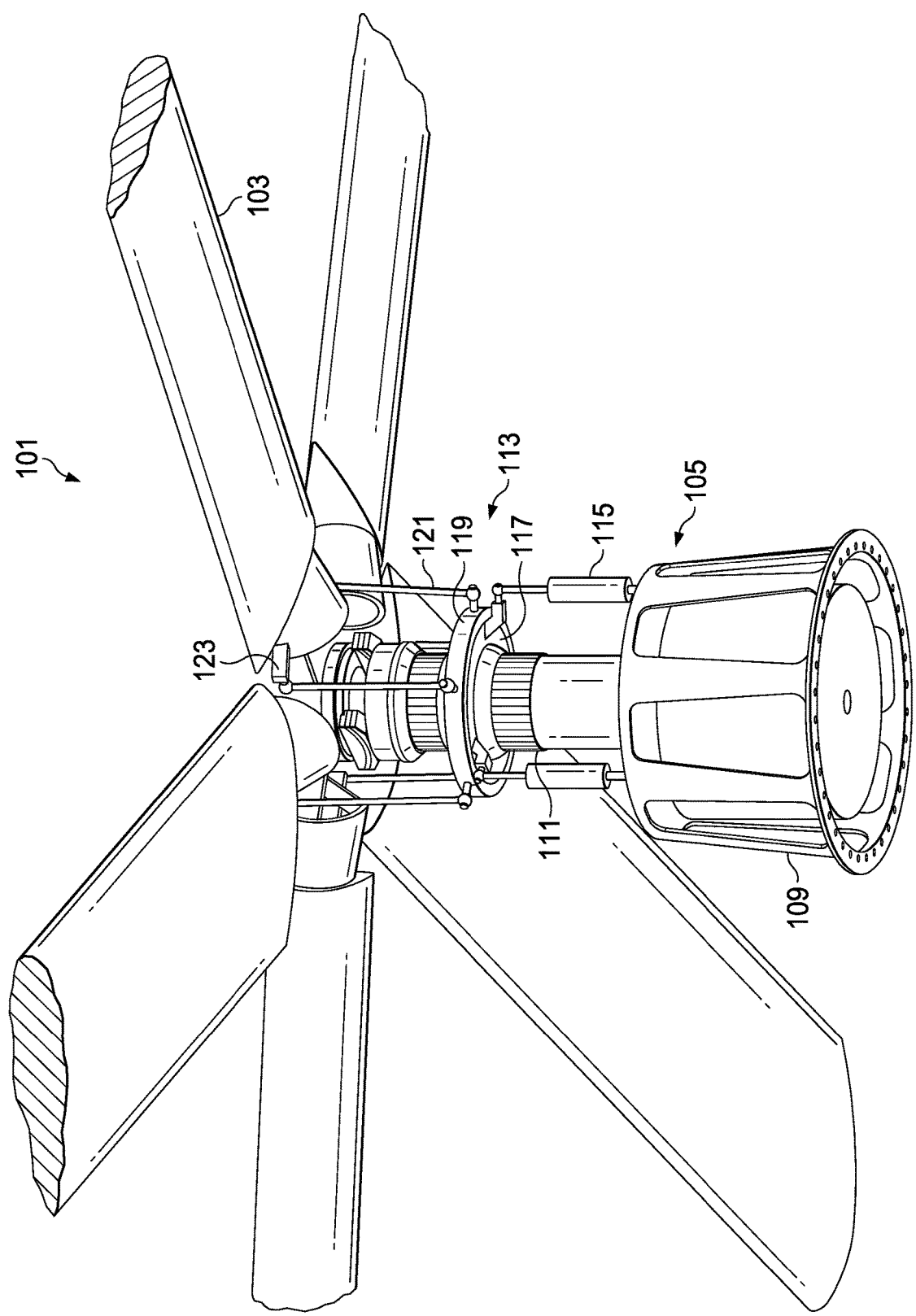
FIG. 2 is an oblique view of a rotor assembly according to this disclosure configured for use in the tiltrotor aircraft of FIG. 1.
Figure 3:
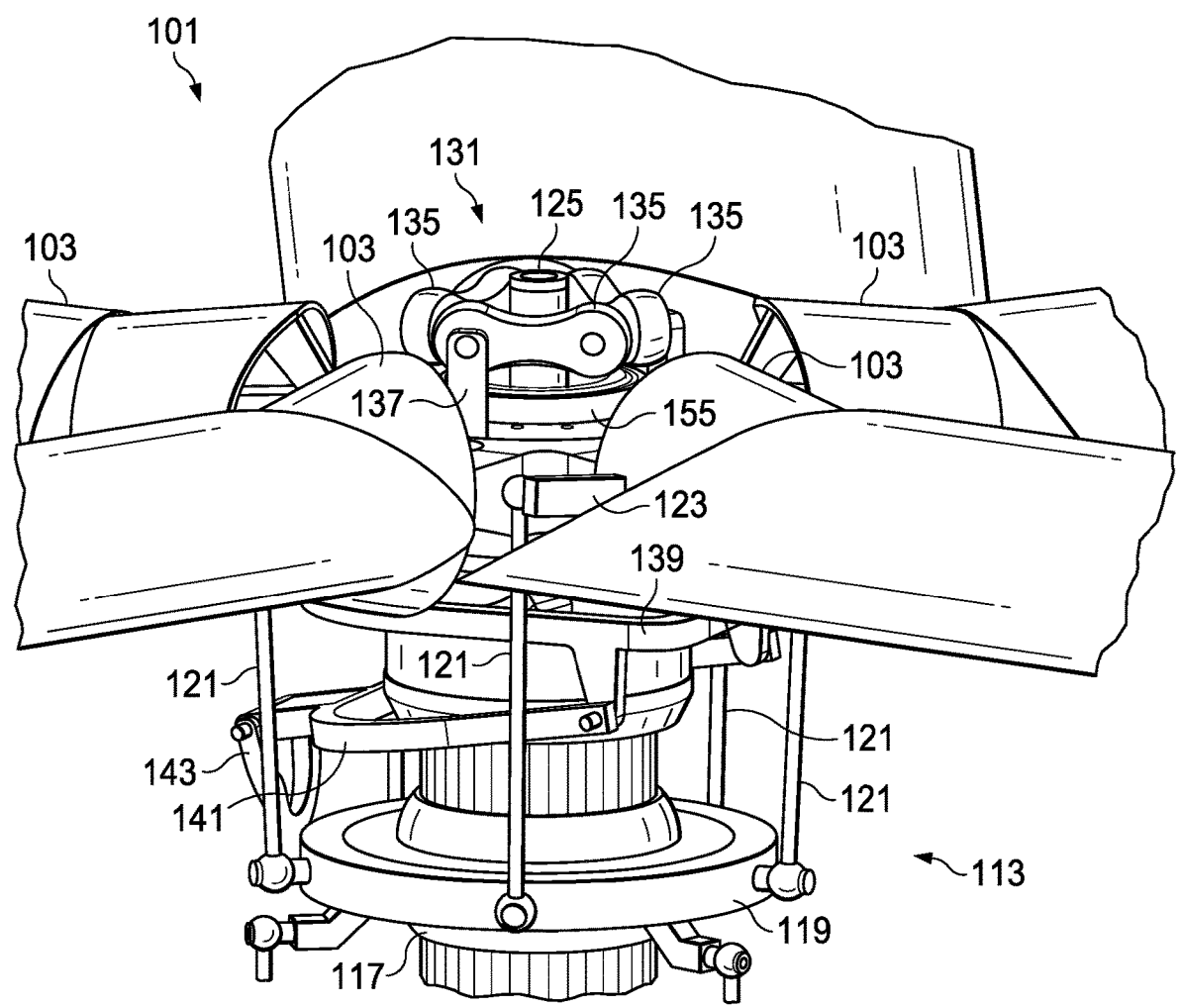
FIG. 3 is another oblique view of the rotor assembly of FIG. 2.

FIGS. 2 and 3 illustrate a rotor assembly 101 that can be implemented as propulsion assembly 13 of aircraft 11. Rotor assembly 101 is not limited to being implemented on aircraft 11 and may be implemented into any suitable rotary-wing aircraft. Rotor assembly 101 is illustrated as comprising five blades 103, however, in some embodiments, rotor assembly 101 includes more or fewer blades 103.

Rotor assembly 101 includes a static mast 105 configured to be coupled to a static portion of aircraft 11, such as a frame of aircraft 11 or any other part of aircraft that remains static with respect to rotating parts of rotor assembly 101. Static mast 105 can house a least a portion or a torque source 107 configured to provide rotational force, or torque, to rotor assembly 101. In some embodiments, torque source 107 is a powerplant or the associated transmission of aircraft 11. In some embodiments, torque source 107 is an electric motor configured to drive rotor assembly 101. Although torque source 107 will be commonly referred to as a transmission throughout this description, torque source 107 can be any suitable device for providing rotational force to rotor assembly 101.

Static mast 105 includes a base 109 configured for coupling with the static portion of aircraft 11 and an elongated housing 111 protruding from a top end of base 109. As illustrated in FIG. 2, both base 109 and elongated housing 111 have a generally cylindrical shape, and base 109 has a greater diameter than elongated housing 111.

Rotor assembly 101 includes a swashplate assembly 113, which is a rise-and-fall tilting swashplate assembly, configured to translate inputs from flight controls of aircraft 11 into pitch motion of rotor blades 103. Swashplate assembly 113 includes actuators 115 and a static ring 117, with bottom ends of actuators 115 coupled to mast base 109 and top ends of actuators 115 coupled to static ring 117. Actuators 115 are configured to cause static ring 117 to move longitudinally and tilt based on control inputs from aircraft 11.

Swashplate assembly 113 has a rotating ring 119 and pitch rods 121. A bottom end of each pitch rod 121 is coupled to rotating ring 119 and a top end of each pitch rod 121 is coupled to a pitch horn 123 of a corresponding rotor blade 103. Rotating ring 119 is rotatably coupled to static ring 117. The longitudinal movements of actuators 115 are transferred from static ring 117 to rotating ring 119 and pitch rods 121 to control the pitch of blades 103.

As will be described in greater detail below, rotor-hub assembly 145 is mounted to static mast 105 by a spherical bearing assembly 147 so that a hub 155 of the rotor-hub assembly 145 can pivot relative to the static mast 105. Due to the pivoting of the hub 155, swashplate assembly 113 includes a drive system that rotates the rotating components of swashplate assembly 113 without being affected by the pivoting of hub 155. As illustrated in FIG. 3, swashplate assembly 113 includes a hub mount 139 that is fixed to hub 155. Swashplate assembly 113 further includes a first linkage 141 hingedly coupled to hub mount 139 and a second linkage 143 hingedly coupled to first linkage 141 and also coupled to rotating ring 119. The described components rotate rotating ring 119 and pitch rods 121 about static mast 105 while also allowing for, due to the hinged connection between linkages 141, 143 and hub mount 139, hub 155 to pivot without influencing the operation of swashplate assembly 113. An outer diameter of swashplate assembly 113 (defined as the diameter at which the bottom ends of pitch rods 121 are coupled to rotating ring 119) is larger than the pitch horn 123 radius (defined as the distance from a pitch axis of blade 103 to the top end of the corresponding pitch rod 121). To help control the change of the pitch of blades 103 due to flapping, rotor assembly 101 may further include an electronic controlled delta-3 controller with software that controls operation of the electronic delta-3 and can also include phase correcting software to control tilting of the hub thrust vector.

Referring to FIGS. 3-7, rotor assembly 101 includes a driveshaft 125 with a first end coupled to an output of transmission 107 by a constant-velocity ("CV") joint 129, driveshaft 125 being configured to be rotated by transmission 107 about a driveshaft axis 167. In some embodiments, CV joint 129 is a bellows-type CV joint. Driveshaft 125 extends through an interior of mast 105 and a second end of driveshaft 125 is coupled to hub 155 by a CV joint 131. As illustrated, CV joint 131 is a three-link CV joint, though other types of CV joints may be used.

Figure 4:
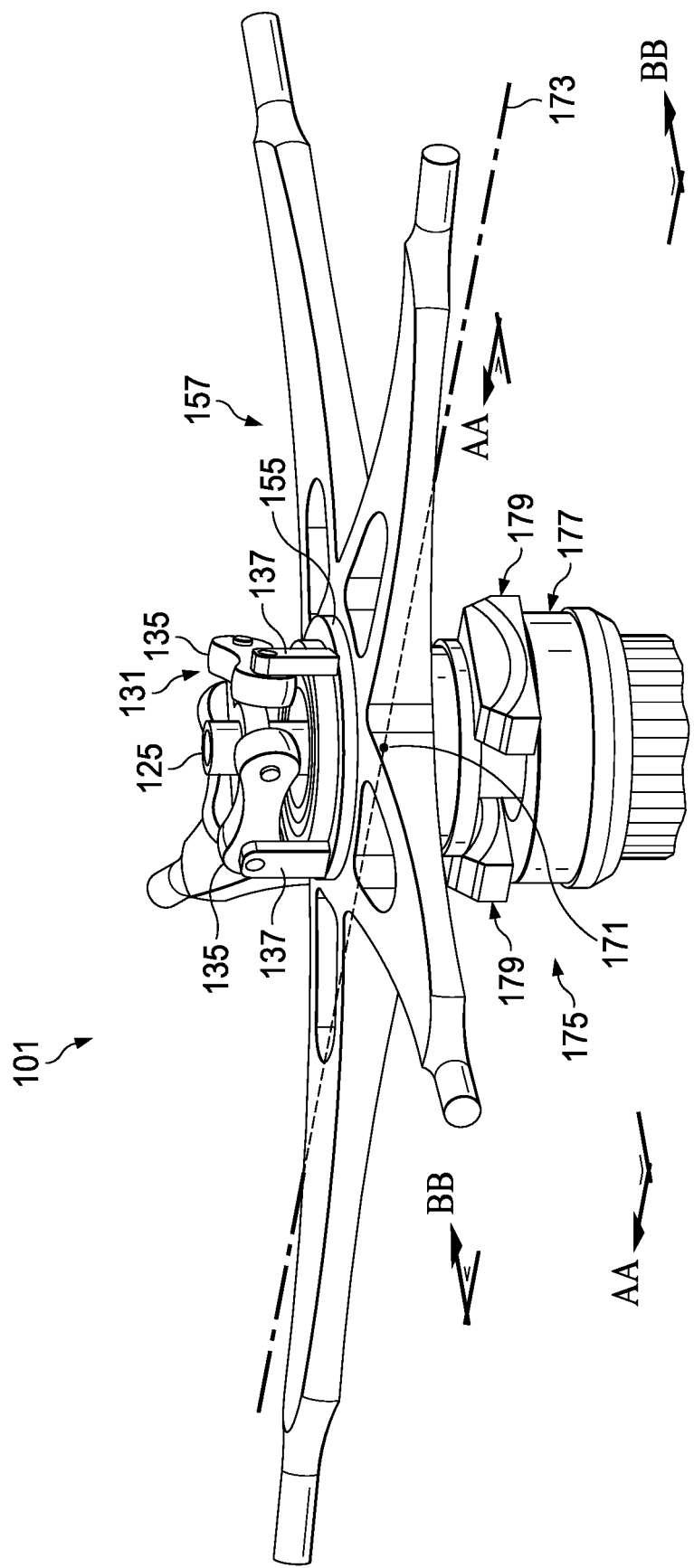
FIG. 4 is an oblique view of the rotor assembly of FIG. 2 with various components removed.
Figure 5:
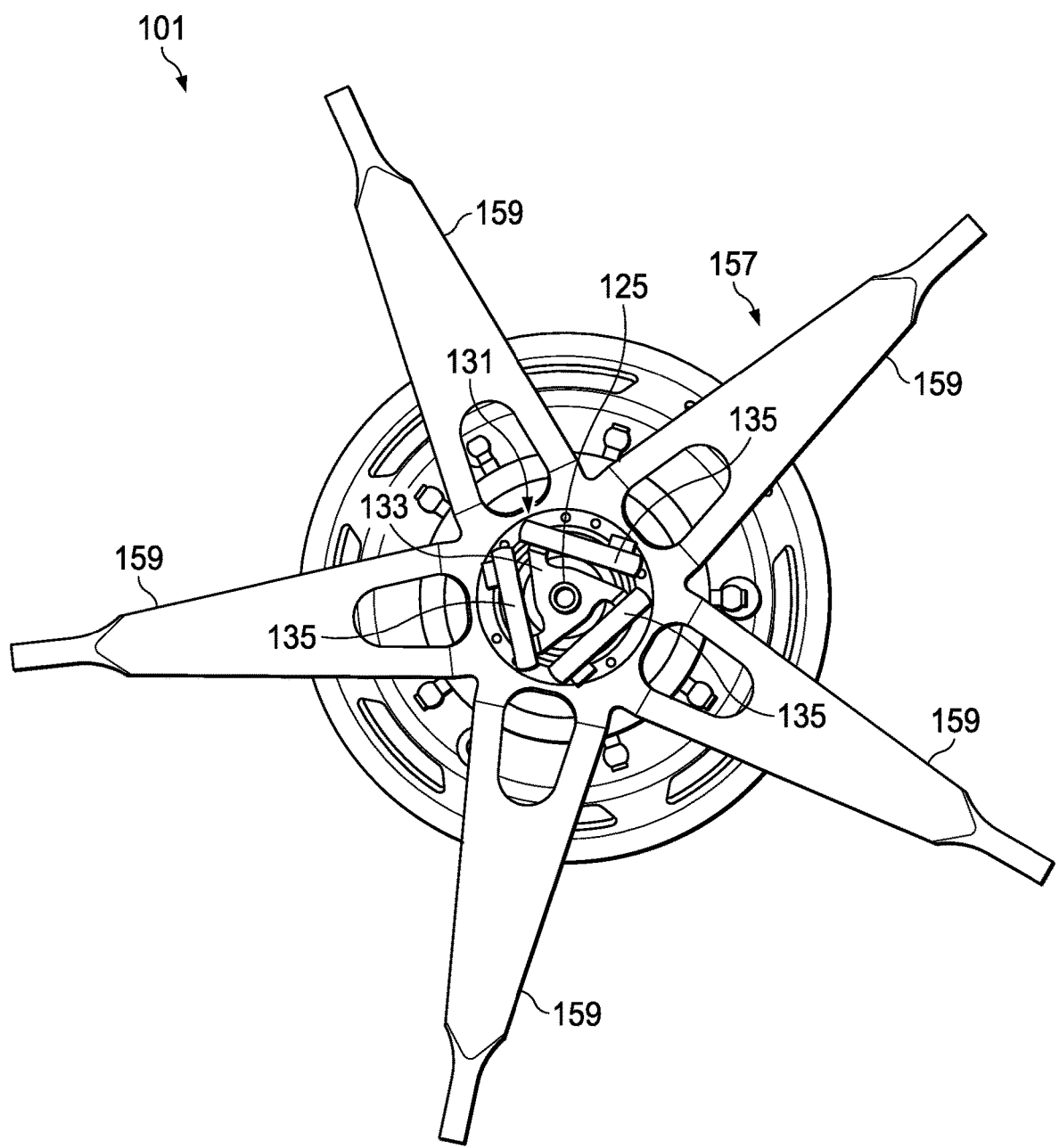
FIG. 5 is a top view of the rotor assembly of FIG. 2.

As illustrated in FIGS. 3-5, CV joint 131 includes a driveshaft mount 133 and three links 135. Driveshaft mount 133 is fixed to driveshaft 125 and one end of each of link 135 is hingedly coupled to driveshaft mount 133. Another end of each link 135 is hingedly coupled to a hub arm 137. Hub arms 137 couple CV joint 131 to hub 155.

Figure 7:
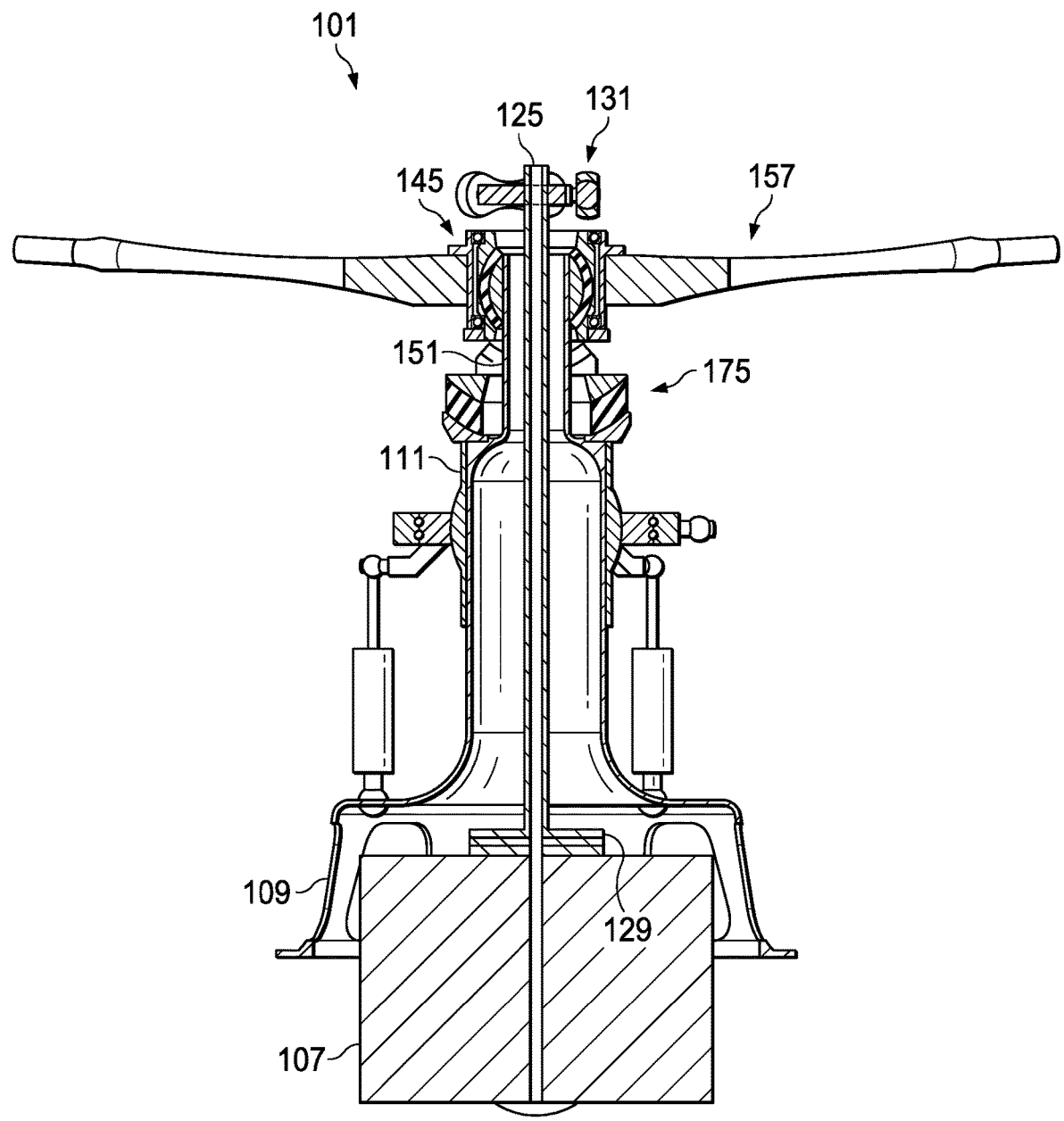
FIG. 7 is a cross-sectional view of the rotor assembly of FIG. 2.
Figure 8:
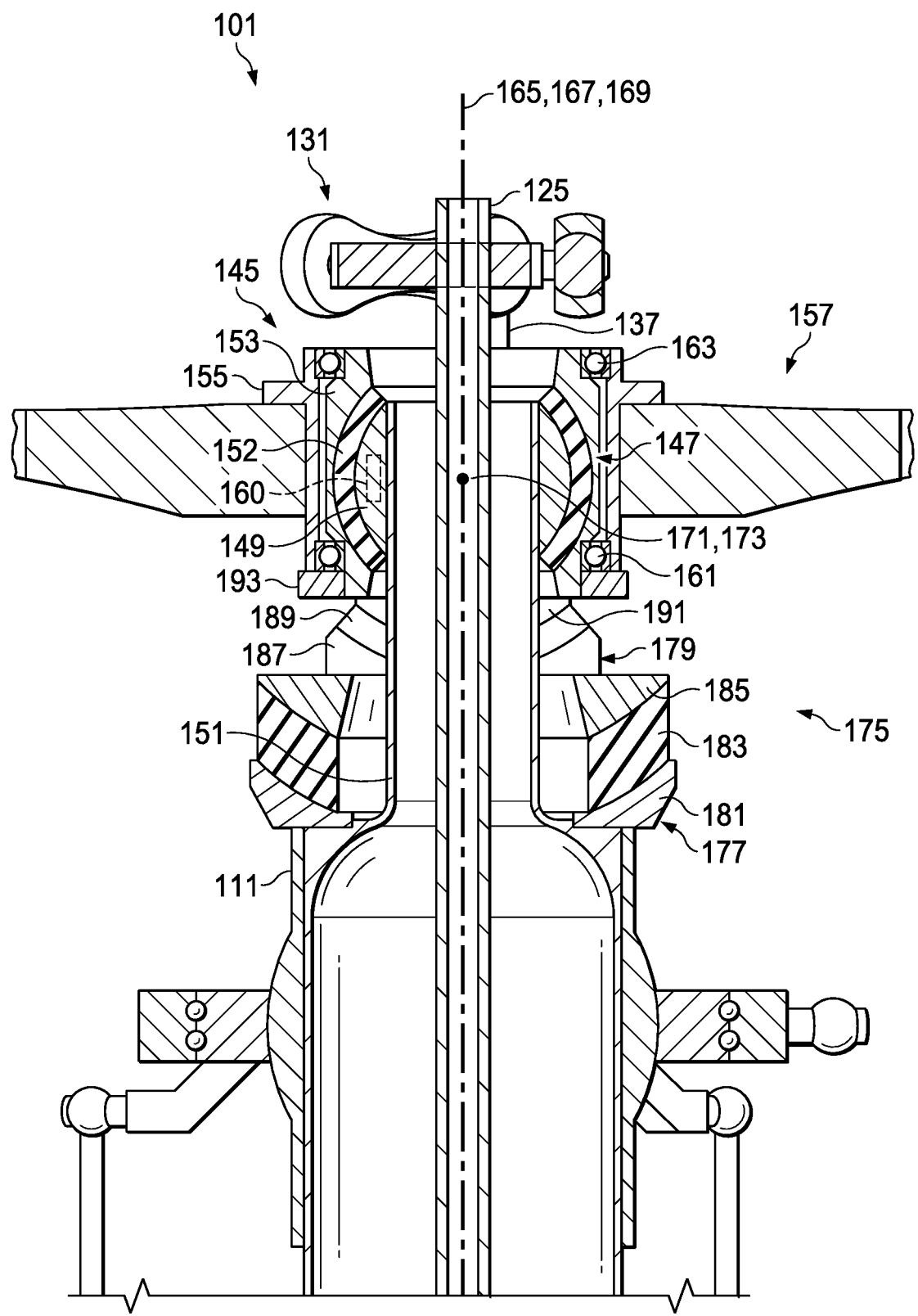
FIG. 8 is an enlarged cross-sectional view of a portion of the rotor assembly of FIG. 2 with a rotor hub in a neutral position.

The cross-sectional views of rotor assembly in FIGS. 7-8 are taken along section line AA, which is perpendicular to axis 173, as illustrated in FIG. 4. Referring to FIG. 8, rotor hub assembly 145 includes a spherical bearing assembly 147. Spherical bearing assembly 147 includes a spherically shaped inner component 149 which is mounted to static mast 105. Specifically, static mast 105 includes a neck portion 151 that protrudes from a top end of the elongated housing 111. As shown, neck portion 151 is also cylindrically shaped and has a smaller diameter than the diameter of elongated housing 111, though other configurations can be used. Inner component 149 is mounted to a top end of neck portion 151. Specifically, an end of neck portion 151 is inserted into an inner bore of inner component 149, and the inner bore of inner component 149 is fixed to the top end of neck portion 151.

Figure 6:
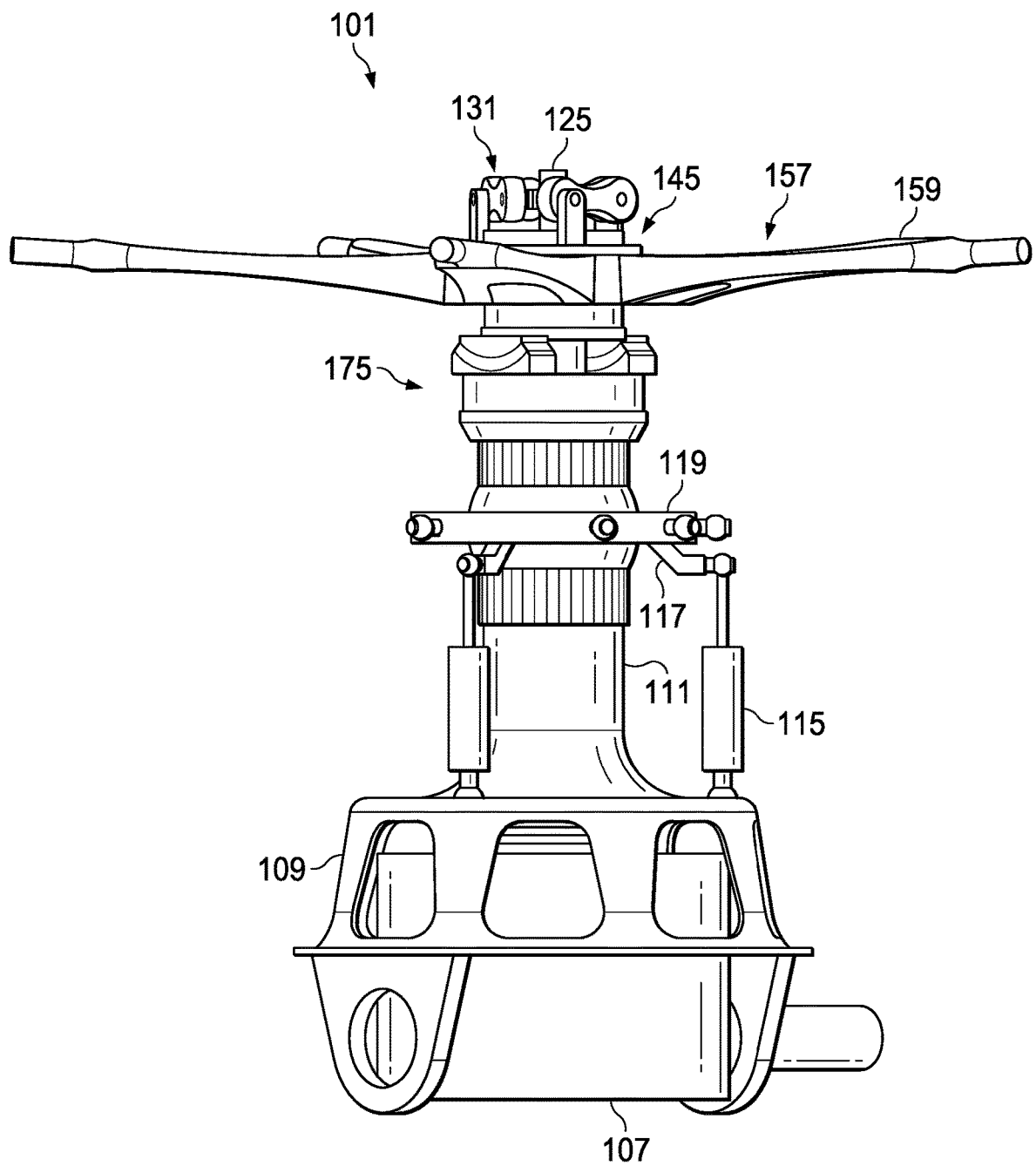
FIG. 6 is a side view of the rotor assembly of FIG. 2.

Outer component 153 is pivotally coupled with a resilient component 152, which can be, for example, a laminated elastomeric component, to spherical inner component 149 about a bearing focus 171. Rotor-hub assembly 145 further includes hub 155 which is rotatably coupled to outer component 153. A yoke 157 is mounted to hub 155 and has a plurality of yoke arms 159 upon which blades 103 are mounted. As illustrated in FIGS. 4 and 6, and as previously discussed, hub 155 is coupled to links 135 of CV joint 131 by hub arms 137. Rotor hub assembly 145 can include a flap sensor 160 configured to detect the angular position of outer component 153 relative to inner component 149, and thus can be used to determine a flap angle of hub 155. Flap sensor 160 can be a mechanical sensor (such as, for example, a tension sensor or a depressible sensor), an optical sensor (such as, for example, a laser sensor), or another sensor that can be used to measure the flap angle of hub 155. Although flap sensor 160 is illustrated as part of inner component 149, one with skill in the art will understand that flap sensor 160 can be located in another part of the non-rotating system of hub assembly 145 or in the rotating system. However, having flap sensor 160 disposed in the non-rotating system can provide sensor readings that are more accurate and more easily obtained than if flap sensor 160 was disposed in the rotating system.

Rotor-hub assembly 145 includes radial ball bearing assemblies 161, 163 configured to allow hub 155 to be rotated by driveshaft 125 about a rotor axis 169 relative to outer component 153. Accordingly, an inner circumferential surface of hub 155 is rotatably coupled with an outer circumferential surface of outer component 153 by radial bearing assemblies 161, 163. Radial bearing assemblies 161, 163 allow hub 155 to be rotated by driveshaft 125 while outer component 153 stays static relative to the rotation of driveshaft 125. Thus, rotation of yoke 157 and blades 103 is achieved based on yoke 157 being mounted to rotatable hub 155.

CV joint 131 is configured to transfer rotational force from driveshaft 125 to hub 155 to rotate hub 155 while also allowing for pivoting of hub 155 about bearing focus 171. Hub 155 is configured to pivot about bearing focus 171 due to being coupled with outer component 153. CV joint 131 allows for the pivoting of hub 155 and provides rotational force to hub 155 in the pivoted position to rotate hub about rotor axis 169.

The rotor assembly 101 further includes a hub-spring assembly 175 configured to oppose the pivoting of hub 155 from a neutral position. The hub-spring assembly 175, as shown, includes a spherical primary hub spring 177 and an optional cylindrical secondary hub spring 179. Primary hub spring 177 includes a first metallic component 181 mounted to a top surface of elongated housing 111, an elastic component 183 disposed on a top surface of the first metallic component 181, and a second metallic component 185 disposed on a top surface of elastic component 183. Secondary hub spring 179 includes a first metallic component 187 coupled to metallic component 185, an elastic component 189 disposed on a top surface of first metallic component 187, and a second metallic component 191 disposed on a top surface of elastic component 189. The second metallic component 191 includes a hub mount ring 193 fixedly coupled to bearing outer component 153 so that ring 193 pivots with outer component 153. Elastic components 183, 189 are made from a material configured to undergo elastic deformation such that the elastic components 183, 189 return to the neutral position illustrated in FIG. 8 after being deformed from the neutral position. In preferred embodiments, elastic components 183, 189 comprise a high-damped elastomer material.

Figure 9:
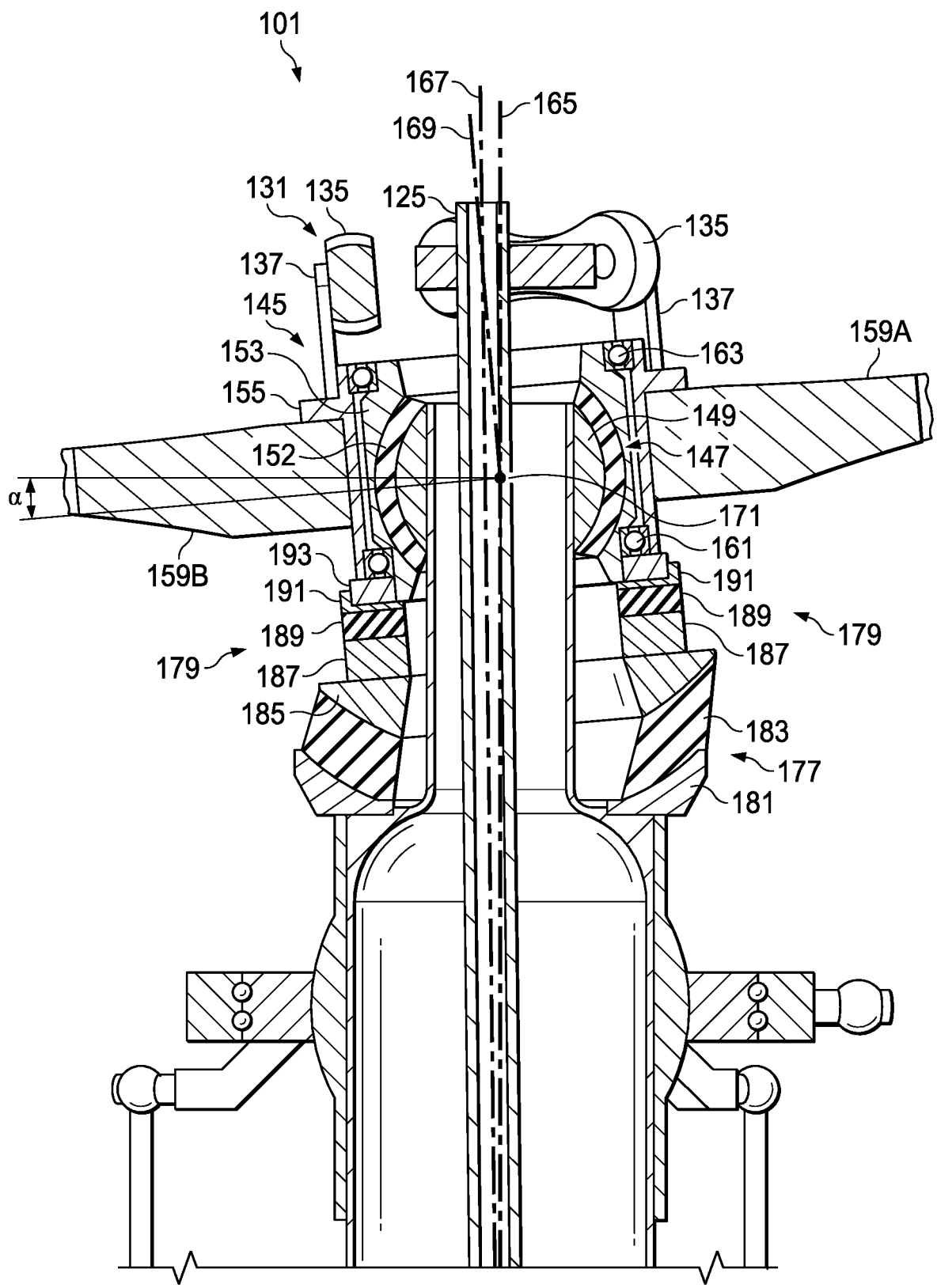
FIG. 9 is an enlarged cross-sectional view of the rotor assembly of FIG. 2 with the rotor hub in a pivoted position.
Figure 10:
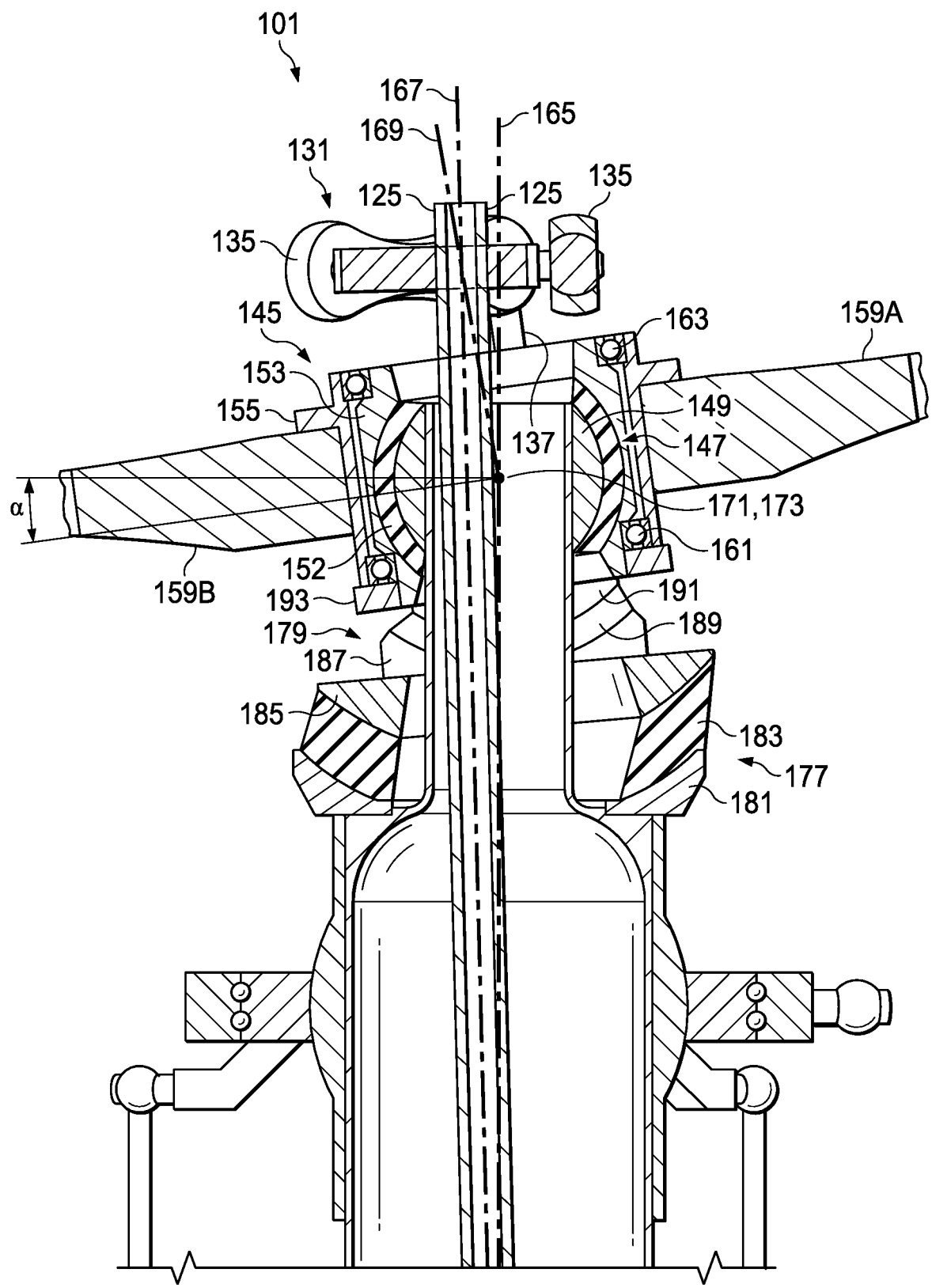
FIG. 10 is another enlarged cross-sectional view of the rotor assembly of FIG. 2 with the rotor hub in another pivoted position.

Referring to FIGS. 9 and 10, as previously mentioned, hub 155 is configured to pivot, or gimbal, about bearing focus 171 due to being rotatably mounted to outer component 153. Hub 155 can be pivoted about bearing focus 171 under a number of different scenarios and situations. For example, pivoting can take place to allow flapping of the blades 103 to compensate for the dissymmetry of lift between blades, such as occurs between advancing and retreating blades during flight in the helicopter mode or that occurs due to various conditions during flight in the airplane mode. The gimbaled configuration means that as blades flap upward in helicopter mode flight or forward in airplane mode flight on one side of the rotor, blades on the other side flap downward or rearward. This will be described for airplane mode flight with blades flapping forward and rearward, though the same description will apply for gimballing occurring during helicopter mode flight. Yoke arm 159A can be associated with blade 103A flapping forward, and yoke arm 159B can be associated with blade 103B flapping rearward. Accordingly, hub 155 pivots about bearing focus 171 to allow for blade 103A to flap forward and blade 103B to flap rearward. Because spherically shaped inner component 149 is used to achieve flapping of blades 103, blades 103 continually flap upward and downward as blades 103 are rotated about rotor axis 169. According to this disclosure, blade flapping occurs at inner component 149 of spherical bearing assembly 147, which is a static portion of hub assembly 145. This disclosure eliminates the need for each of the blades to have its own flapping hinge and achieves flapping at a static part of the hub assembly 145 instead of at rotating part of the hub assembly 145.

FIG. 9 is taken along section line BB illustrated in FIG. 4, which is parallel and coplanar with axis 173. Referring to FIGS. 4 and 9, hub spring 177 is coupled to outer component 153 to oppose pivoting of hub 155 from the neutral position illustrated in FIG. 8. In this position, spring 177 is configured to deform about focus 171 based on hub 155 pivoting about focus 171. Specifically, when hub 155 pivots about focus 171, elastic component 183 is configured to elastically deform in shear about focus 171, thereby providing a force for opposing pivoting of hub 155. Spring 177 is a spherical spring and its elastic component 183 is thus configured to deform in shear when hub 155 pivots about any axis coplanar with axis 173 and passing through focus 171. Metallic component 185 is coupled with hub 155 and is configured to rotate with hub 155 about focus 171, while metallic component 181 is fixed to the top surface of elongated housing 111 and is not configured to pivot about focus 171 with hub 155. When optional cylindrical spring 179 is installed, elastic component 189 is not configured to deform about focus 171 in the plane illustrated in FIG. 9.

FIG. 10 is taken along section line AA, which is perpendicular to axis 173, as illustrated in FIG. 4. Referring to FIGS. 4 and 10, hub springs 177 and 179 are coupled to outer component 153 by mounting ring 193 to oppose the pivoting of hub 155 from the neutral position illustrated in FIG. 8. Spherical hub spring 177 is configured to oppose pivoting of hub 155 about bearing focus 171, whereas cylindrical hub spring 179 is configured to oppose pivoting of hub 155 along pivot axis 173 passing through bearing focus 171. Elastic components 189 and 183 are configured to elastically deform in shear when hub 155 pivots, thereby providing a force for opposing pivoting of hub 155. As shown in FIG. 10, when hub 155 pivots about axis 173, mounting ring 193 pivots with hub 155 and elastic component 189 is configured to deform in shear to allow metallic component 191 to pivot about axis 173 with hub 155 and ring 193. Metallic component 187 is fixedly connected to metallic component 185 of spherical hub spring 177, and the pivoting of hub 155 also causes elastic component 183 to shear so that metallic components 185 and 187 pivot about axis 173. Metallic component 181 is coupled to the top surface of elongated housing 111 and, thus, does not rotate about axis 173 when hub 155 pivots. When hub 155 pivots about axis 173, metallic components 185, 187, and 191 shift toward the forward flapping side of hub 155 due to the deforming of elastic components 189 and 183 described.

The amount of pivoting allowed by the combined deformation of elastic components 183, 189 in the plane of FIG. 10 is greater than that allowed in the perpendicular plane illustrated in FIG. 9, in which only elastic component 183 can deform. Accordingly, together, springs 177 and 179 oppose pivoting of hub 155 with a stiffer spring rate in the plane illustrated in FIG. 9 than they do about axis 173 shown in FIG. 10 due to elastic component 189 not being configured for elastic deformation in the plane illustrated in FIG. 9. One with skill in the art will understand that elastic component 189 deforms to its greatest degree in the plane illustrated in FIG. 10 and incrementally more or less while rotating toward or away from the plane of FIG. 10. Hub 155 can pivot about pivot axis 173 to a greater degree, as shown in FIG. 10, than in the position shown in FIG. 9 and, accordingly, blades 103 flap to a greater degree about axis 173 than in the position shown in FIG. 9. Accordingly, the amount by which a blade 103 flaps as it rotates with hub 155 is variable depending on the azimuth position of the blade 103 due to the differential spring rates opposing pivoting of hub 155 by hub springs 177 and 179.

One having skill in the art will recognize that hub springs 177, 179 opposing the pivoting of hub 155 with differential spring rates has many different advantages. For example, when tiltrotor aircraft 11 is in the airplane mode, axis 173 can be arranged to be generally horizontal and parallel with the length of wing 17 so that a stiff spring rate opposes pivoting of hub 155 as blades 103 approach wing 17 and a softer spring rate opposes pivoting of hub 155 as blades 103 move away from wing 17. This configuration prevents blades 103 from flapping too close toward, and potentially cutting, wing 17 while allowing for a greater degree of flapping when blades 103 are not aligned with wing 17.

Because hub-spring assembly 175 is part of the non-rotating system of rotor assembly 101, elastic components 183, 189 are only subject to steady state flapping motions and are not subject to oscillatory motions of hub 155. Accordingly, elastic components 183, 189 can be sized using static shear loads rather than oscillatory loads and can thus be reduced in size. Additionally, because hub-spring assembly 175 is part of the non-rotating system, hub-spring assembly 175 can be configured to provide an in-flight adjustable spring rate for resisting pivoting of hub 155. For example, a mechanically or electrically controlled pin or other retention device can be used to selectively prevent deformation of elastic components 183, 189.

Various components of rotor assembly 101 can be used to limit flapping of blades 103. Hub-spring assembly 175 can be used as a flap stop to limit the amount by which blades 103 can flap. For example, hub-spring assembly 175 can be configured to allow hub 155 to pivot until the pivoting causes metallic component 185 to come into contact with neck portion 151. The contact between metallic component 185 and neck portion 151 stops pivoting of hub 155 and thus flapping of blades 103. An inner surface of metallic component 185 can be shaped to allow for variable flap limits based on the azimuth position. The bottom end of outer component 153 coming into contact with neck portion 151 can also be used to limit flapping. Similarly, the bottom end of outer component 153 can be shaped to allow for variable flap limits based on the azimuth position.

In the embodiment illustrated in the drawings, hub-spring assembly 175 has a cylindrical spring 179 and a spherical spring 177. However, as previously discussed, in other embodiments hub-spring assembly 175 does not include a cylindrical spring 179 and only includes a spherical spring 177. In embodiments where the hub-spring assembly 175 only includes spherical spring 177, one with skill in the art will understand that a constant spring rate is applied to hub 155 such that hub 155 can pivot uniformly as it rotates about rotor axis 169.

According to various embodiments, based on the disclosed configuration, driveshaft 125 only carries torque loads between transmission 107 and hub 155. The thrust loads created by blades 103 are transferred from blades 103 to hub assembly 145 and static mast 105 without being transferred to driveshaft 125. Additionally, lateral loads generated in blades 103 based on movement of the aircraft or wind are also transferred from blades 103 to hub assembly 145 and static mast 105 without being transferred to driveshaft 125. In these embodiments, CV joint 131 allows for hub 155 to pivot about focus 171 and also rotate about rotor axis 169 without applying a shear load to or affecting the position of driveshaft 125. In these embodiments, an angle α by which hub 155 is pivoted from a neutral position can be equal to an angle by which rotor axis 169 is offset from driveshaft axis 167.

However, according to various embodiments of the disclosure, hub 155 can pivot to such a degree that the pivoting cannot be completely compensated for by CV joint 131 and a shear load is applied to the driveshaft 125 by CV joint 131. Referring to FIGS. 9 and 10, CV joint 129 allows for driveshaft 125 to slightly tilt or cock relative to a static mast axis 165 when it experiences shear forces from CV joint 131. Instead of driveshaft 125 being bent by the shear forces from CV joint 131, CV joint 129 allows driveshaft 125 to slightly cock so that the shear load is not applied to driveshaft 125 and is instead transferred to transmission 107. CV joint 129 enables driveshaft 125 to continue to rotate about driveshaft axis 167 in the tilted position. Accordingly, due to driveshaft 125 being coupled to the transmission 107 at a first end by CV joint 129 and being coupled to hub assembly 145 at a second end by CV joint 131, hub 155 can pivot without applying shear loads to driveshaft 125 and driveshaft 125 only carries torque loads between transmission 107 and hub 155. Due to driveshaft 125 only having to withstand the torque loads described, the strength of driveshaft 125 can be reduced when compared to traditional rotor mast assemblies. Accordingly, the weight of driveshaft 125, and thus the overall weight of rotor assembly 101, can be reduced.

In the pivoted positions illustrated in FIGS. 9 and 10, driveshaft axis 167 and rotor axis 169 are offset from static mast axis 165. Hub 155 is pivoted from a neutral position by angle α. According to various embodiments, hub 155 is configured to pivot about bearing focus 171 from a neutral position by as much as 15 degrees. Angle α can be greater in FIG. 10 than in FIG. 9 due to both elastic components 183 and 189 deforming as hub 155 pivots about axis 173, as previously discussed. CV joint 131 may compensate for most of the pivoting of hub 155, and the rest may be compensated by CV joint 129 allowing driveshaft 125 to tilt relative to mast axis 165. Accordingly, a sum of the angle by which rotor axis 169 is offset from driveshaft axis 167 and the angle by which driveshaft axis 167 is offset from static mast axis 165 can be equal to angle α by which hub 155 is pivoted from the neutral position.

Figure 11:
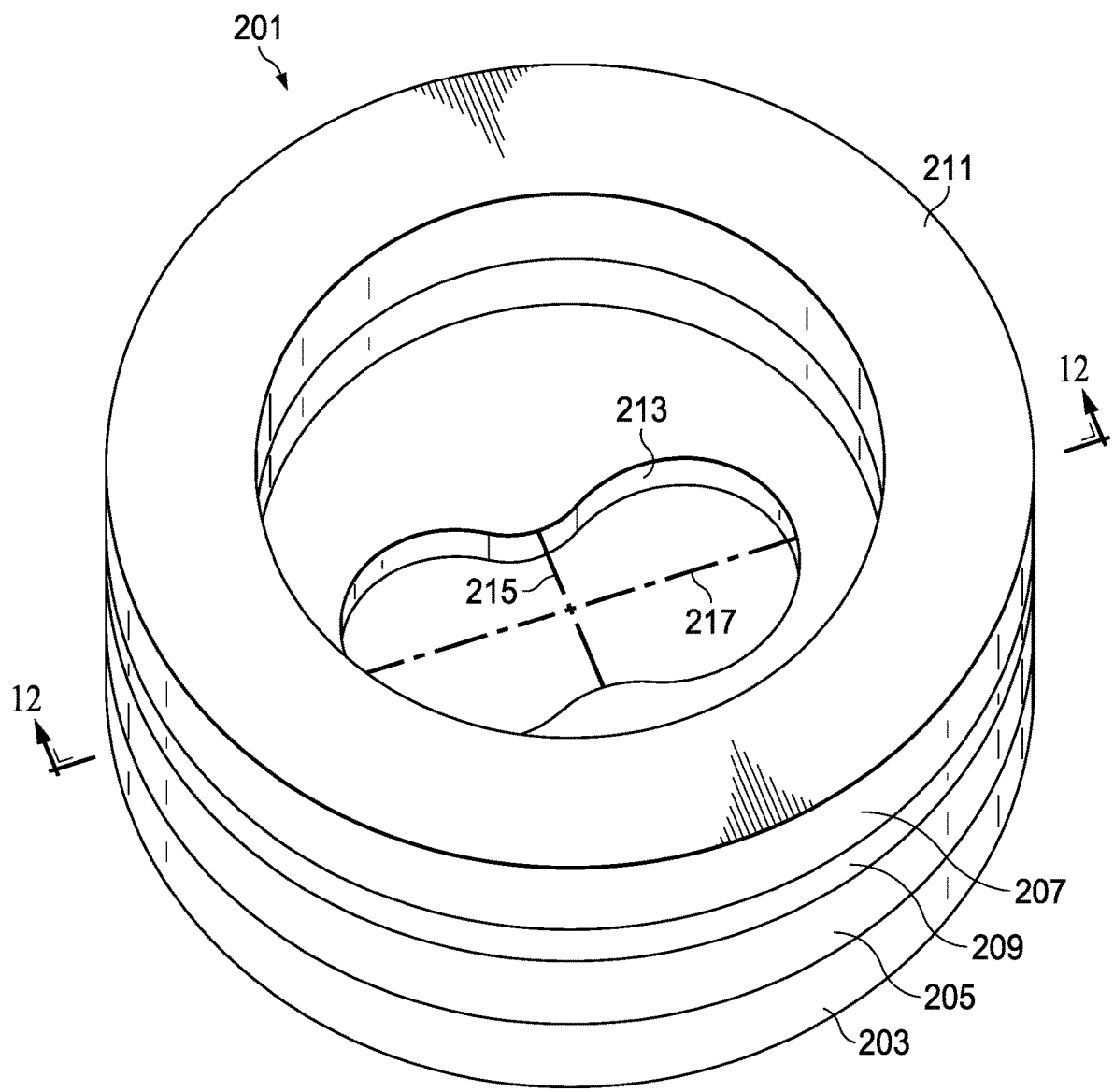
FIG. 11 is an oblique view of a hub-spring assembly according to another embodiment of the rotor assembly of FIG. 2.
Figure 12:
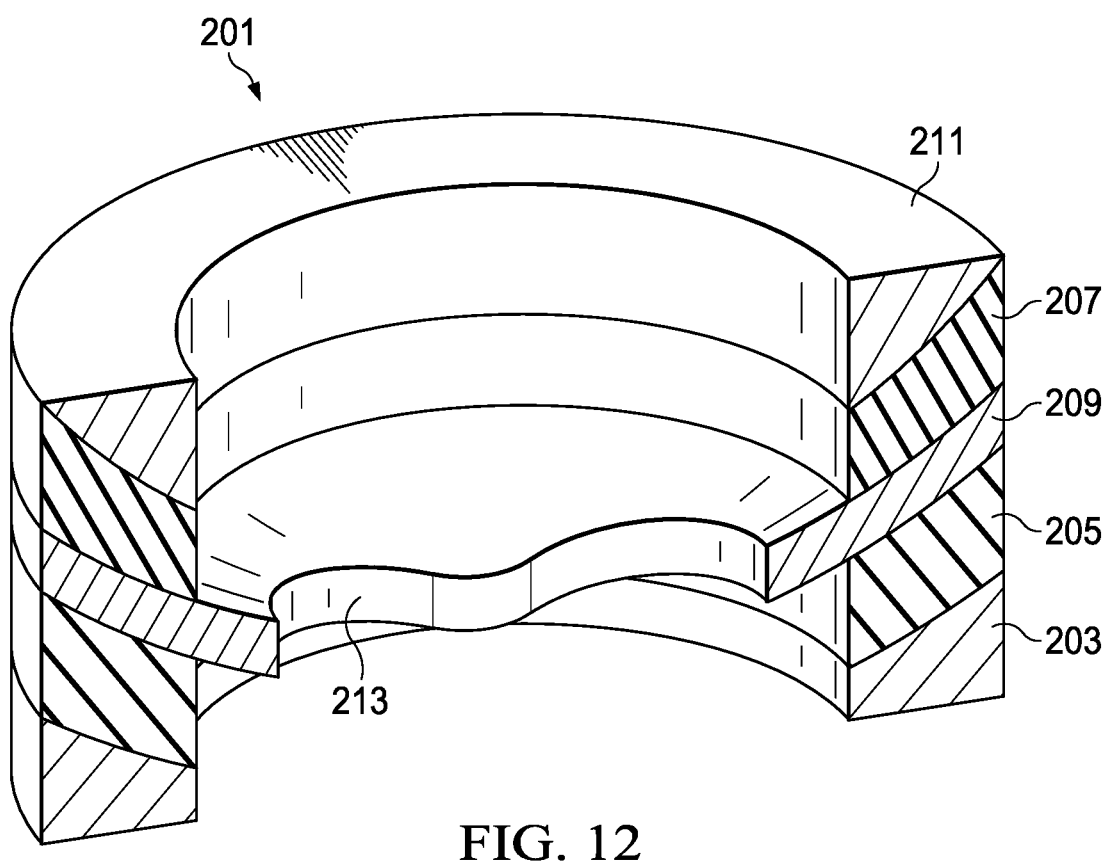
FIG. 12 is an oblique cross-sectional view of the hub-spring assembly of FIG. 11.

Referring to FIGS. 11 and 12, an alternative embodiment of a hub-spring assembly 201 is illustrated. In some embodiments, rotor assembly 101 can incorporate hub-spring assembly 201 instead of hub-spring assembly 175. Similar to hub-spring assembly 175, hub-spring assembly 201 resists pivoting of hub 155 with variable spring rates, and thus allows for variable pivoting of hub 155 based on the azimuth position at which the pivoting occurs. Hub-spring assembly 201 includes a bottom metallic component 203, a first and a second elastic component 205, 207 coupled together by a stop plate 209, and a top metallic component 211. Similar to hub-spring assembly 175, hub-spring assembly 201 can be coupled to mast 105 by mounting bottom metallic component 203 to the top surface of elongated housing 111 and coupling top metallic component 211 to hub mounting ring 193. When mounted, neck portion 151 extends through an aperture 213 of stop plate 209. As illustrated, aperture 213 is generally figure-eight shaped, and hub-spring assembly 201 can be mounted such that a short axis 215 of aperture 213 is parallel with axis 173 and a long axis 217 of aperture 213 is perpendicular to axis 173. First and second elastic components 205, 207 are first and second spherical springs having the same focus, which is colocated with bearing focus 171 when installed on assembly 101. Elastic components 205, 207 can be substantially similar to spherical spring elastic component 183 previously described and can comprise a high-damped elastomer material.

Stop plate 209 and aperture 213 are configured to limit the pivoting of hub 155 about focus 171. When hub 155 pivots about focus 171, top metallic component 211 also pivots about focus 171 due to being coupled with ring 193. Elastic component 207 deforms in shear due to the pivoting and shifts stop plate 209 until an inner surface of aperture 213 contacts neck portion 151. Accordingly, stop plate 209 limits deformation of hub-spring assembly 201 and thus limits the amount by which hub 155 is able to pivot. One with skill in the art will understand that a sacrificial and replaceable wear piece can be incorporated to either the outer surface of neck portion 151 that contacts aperture 213 or the inner surface of aperture 213 so that the contacting pieces are not damaged during operation.

Hub-spring assembly 201 resists pivoting of hub 155 with variable spring rates, and thus allows for variable pivoting of hub 155 based on the azimuth position at which the pivoting occurs. For example, when hub 155 pivots about focus 171 about an axis perpendicular to axis 173 (and, thus, parallel with long axis 217), aperture 213 can be sized such that only elastic component 207 experiences deformation. During pivoting of hub 155 about the axis parallel to long axis 217, elastic component 207 may deform and shift stop plate 209 such that one of the convex portions of aperture 213 (bisected by short axis 215) contacts neck portion 151 to limit the pivoting of hub 151. In this position, the first elastic component 205 is not deformed because hub 155 is stopped from pivoting by stop plate 209 before hub 155 can pivot enough to apply a significant shear load to elastic component 205.

However, when hub 155 pivots about axis 173 (which is parallel to short axis 215), aperture 213 can be sized such that both elastic components 205, 207 experience deformation. During pivoting of hub 155 about axis 173, elastic components 205, 207 can both deform in shear due to the pivoting of hub 155 before one of the concave inner surface of aperture 213 (bisected by long axis 217) comes into contact with neck portion 151 to stop the pivoting of hub 155. Accordingly, hub 155 can pivot to a greater degree about axis 173 than the axis perpendicular to axis 173 due to both elastic components 205, 207 experiencing deformation. One with skill in the art will understand that elastic component 205 deforms to its greatest degree when hub 155 pivots about axis 173 and incrementally more or less while rotating toward or away from axis 173. Accordingly, as previously described, rotor assembly can be positioned on wing 17 such that axis 173 (and, thus, short axis 215) is substantially parallel with the length of wing 17 so that blades 103 are prevented from flapping too close toward, and potentially cutting, wing 17 while allowing for a greater degree of flapping when blades 103 are not aligned with wing 17.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A gimbaled rotor assembly for an aircraft, comprising:
   a static mast;
   a spherical bearing comprising an inner component and an outer component pivotable relative to each other about a bearing focus, the inner component fixedly coupled to the static mast;
   a rotor hub rotatably coupled to the outer component, allowing for relative rotation of the rotor hub about a rotor axis and for pivoting together with the outer component about the bearing focus; and
   a primary hub spring coupling the outer component to the static mast and configured for opposing pivoting of the rotor hub about the bearing focus from a neutral position.

2. The gimbaled rotor assembly of claim 1, further comprising:
   a driveshaft at least partially housed within the static mast and configured to be driven by a torque source; and
   a first constant-velocity (CV) joint coupling a first end of the driveshaft to an output of the torque source.

3. The gimbaled rotor assembly of claim 1, further comprising:
   a driveshaft at least partially housed within the static mast and configured to be driven about a driveshaft axis by a torque source; and
   a second CV joint coupling a second end of the driveshaft to the rotor hub.

4. The gimbaled rotor assembly of claim 3, wherein the second CV joint is configured to rotate the rotor hub while allowing for misalignment between the rotor axis and the driveshaft axis.

5. The gimbaled rotor assembly of claim 1, further comprising a driveshaft extending from an interior of the static mast through a bore of the inner component.

6. The gimbaled rotor assembly of claim 1, further comprising a plurality of blades coupled to the rotor hub;
   wherein the outer component is configured to pivot about the bearing focus to allow for flapping of the plurality of blades.

7. The gimbaled rotor assembly of claim 1, further comprising:
   a driveshaft at least partially housed within the static mast;
   a first CV joint coupling a first end of the driveshaft to an output of a torque source; and
   a second CV joint coupling a second end of the driveshaft to the rotor hub;
   wherein the first CV joint is configured to rotate the driveshaft while allowing for the driveshaft to tilt relative to the static mast during pivoting of the rotor hub about the bearing focus.

8. The gimbaled rotor assembly of claim 1, further comprising a secondary hub spring opposing pivoting of the rotor hub about the bearing focus from the neutral position and coupling the static mast to the primary hub spring or coupling the primary hub spring to the outer component.

9. The gimbaled rotor assembly of claim 8, wherein the primary hub spring is spherical and the secondary hub spring is cylindrical.

10. The gimbaled rotor assembly of claim 1, wherein the primary hub spring opposes pivoting of the rotor hub about a first pivot axis with a first spring rate and opposes pivoting of the rotor hub about other pivoting axes with other spring rates stiffer than the first spring rate.

11. An aircraft comprising:
a wing; and
a gimbaled rotor assembly pivotally mounted to the wing, the gimbaled rotor assembly including:
a static mast;
a spherical bearing comprising an inner component and an outer component pivotable relative to each other about a bearing focus, the inner component fixedly coupled to the static mast;
a rotor hub rotatably coupled to the outer component, allowing for relative rotation of the rotor hub about a rotor axis and for pivoting together with the outer component about the bearing focus; and
a primary hub spring coupling the outer component to the static mast and configured for opposing pivoting of the rotor hub about the bearing focus from a neutral position.

12. The aircraft of claim 11, wherein the gimbaled rotor assembly further comprises:
a driveshaft at least partially housed within the static mast and configured to be driven by a torque source; and
a first constant-velocity (CV) joint coupling a first end of the driveshaft to an output of the torque source.

13. The aircraft of claim 11, wherein the gimbaled rotor assembly further comprises:
a driveshaft at least partially housed within the static mast and configured to be driven about a driveshaft axis by a torque source; and
a second CV joint coupling a second end of the driveshaft to the rotor hub and configured to rotate the rotor hub while allowing for misalignment between the rotor axis and the driveshaft axis.

14. The aircraft of claim 11, wherein the gimbaled rotor assembly further comprises a driveshaft extending from an interior of the static mast through a bore of the inner component.

15. The aircraft of claim 11, wherein:
the gimbaled rotor assembly further comprises a plurality of blades coupled to the rotor hub; and
the outer component is configured to pivot about the bearing focus in response to allow for flapping of the plurality of blades.

16. The aircraft of claim 11, wherein the gimbaled rotor assembly further comprises:
a driveshaft at least partially housed within the static mast;
a first CV joint coupling a first end of the driveshaft to an output of a torque source; and
a second CV joint coupling a second end of the driveshaft to the rotor hub;
wherein the first CV joint is configured to rotate the driveshaft while allowing for the driveshaft to tilt relative to the static mast during pivoting of the rotor hub about the bearing focus.

17. The aircraft of claim 11, wherein the gimbaled rotor assembly further comprises a secondary hub spring opposing pivoting of the rotor hub about the bearing focus from the neutral position and coupling the static mast to the primary hub spring or coupling the primary hub spring to the outer component.

18. The aircraft of claim 17, wherein the primary hub spring is spherical and the secondary hub spring is cylindrical.

19. The aircraft of claim 11, wherein the primary hub spring opposes pivoting of the rotor hub about a first pivot axis with a first spring rate and opposes pivoting of the rotor hub about other pivoting axes with other spring rates stiffer than the first spring rate.

20. The aircraft of claim 19, wherein:
the wing has a length extending from a center of the aircraft to a free end of the wing; and
the first pivot axis is substantially parallel with the length of the wing.

* * * * *